March 10, 1953 A. L. AREY ET AL 2,630,821
AUTOMATIC CHANGEOVER VALVE AND SIGNAL
Filed April 27, 1949 3 Sheets-Sheet 3

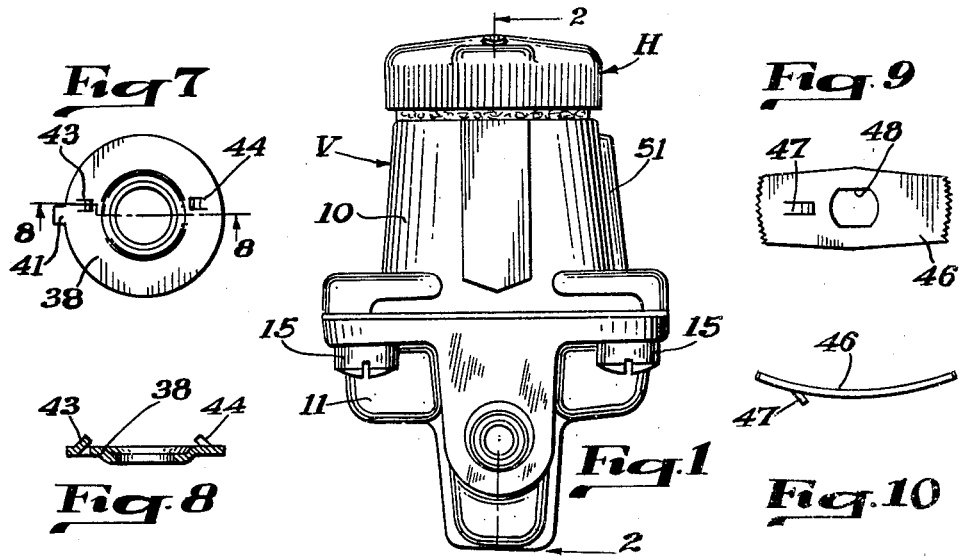
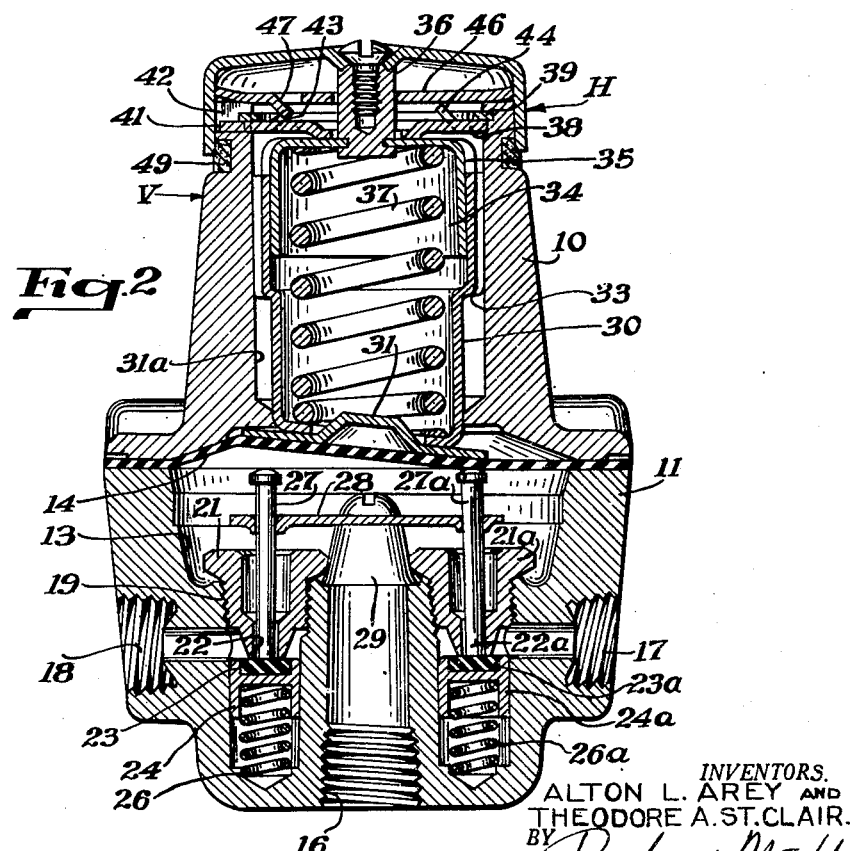

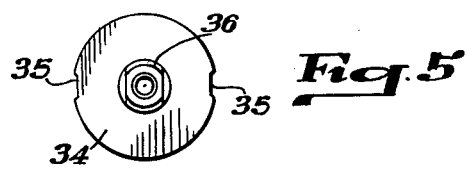
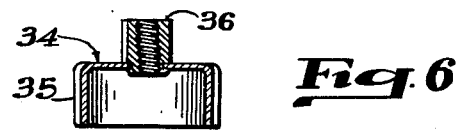
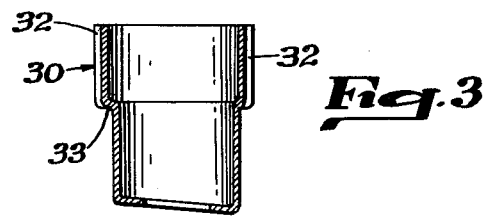
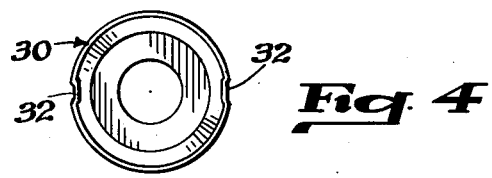
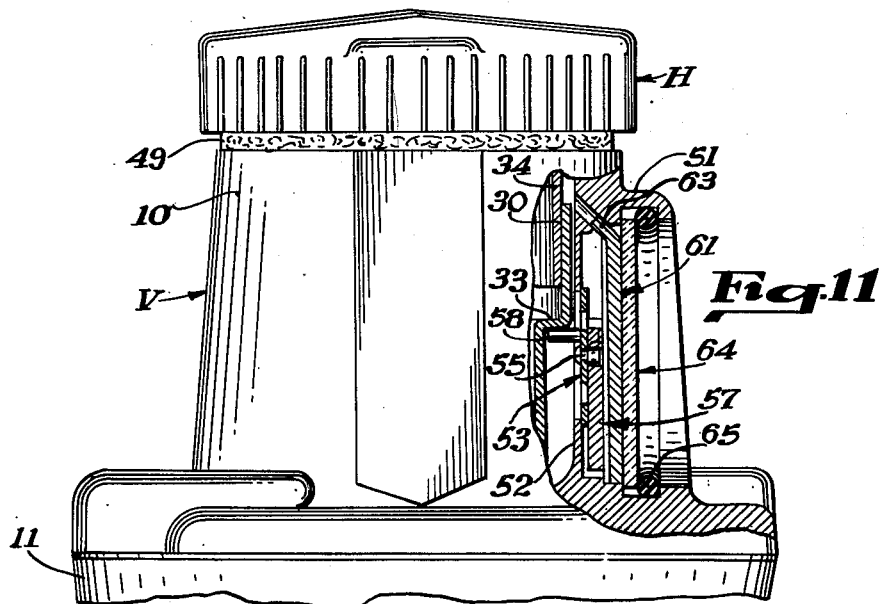

INVENTORS.
ALTON L. AREY AND
THEODORE A. ST. CLAIR.
BY Richey & Watts
ATTORNEYS.

Patented Mar. 10, 1953

2,630,821

UNITED STATES PATENT OFFICE 2,630,821

AUTOMATIC CHANGEOVER VALVE AND SIGNAL

Alton L. Arey, East Cleveland, and Theodore A. St. Clair, South Euclid, Ohio, assignors to The Weatherhead Company, Cleveland, Ohio, a corporation of Ohio Application April 27, 1949, Serial No. 89,826

6 Claims. (Cl. 137—113)

This invention relates to pressure-reducing regulators for supplying fluid to a service conduit from a plurality of separate supply sources and, more particularly, to an improved automatic changeover regulator for selectively supplying gas from service and reserve pressure cylinders.

In isolated fuel supply systems, gas such as liquefied petroleum gas is supplied for domestic use from containers which store the gas under pressure, one container being a service cylinder and the other a reserve cylinder. Gas under regulated pressure is supplied first from the service cylinder until pressure therein drops to a predetermined point, whereupon the service line is automatically shifted to the reserve cylinder which supplies gas at reduced pressure. Manual control means are provided to isolate the service cylinder and open the reserve cylinder to the line of full pressure.

It is an object of the invention to provide an automatic changeover regulator valve that is compact in its construction, simply manufactured, and economically fabricated.

It is a further object to provide signal means that indicate the depleted condition of the service cylinder and the connection of the reserve cylinder into the service line, which signal means are compact, simply constructed, and readily assembled in the valve. It is a feature of the invention that the signal device is restored to its initial position upon manipulation of manual means to switch the reserve tank to the line at full pressure and isolate the depleted service tank.

Another object of the invention is to provide a combined spring cartridge manual changeover cam and signal operating device which is compact, rugged, and readily assembled in construction.

The manner in which these objects are attained will be apparent from the following description of a preferred form of the invention.

In the drawings:

Fig. 1 is an end elevation of the valve;

Fig. 2 is a section thereof taken on 2—2 of Fig. 1;

Figs. 3 and 4 are views of one of the cup-shaped spring retaining members;

Figs. 5 and 6 are views of the other spring retaining member;

Figs. 7 and 8 show the combined retaining and indexing plate;

Figs. 9 and 10 show details of the handle construction;

Fig. 11 is a partial section through the signal mechanism;

Figure 12:
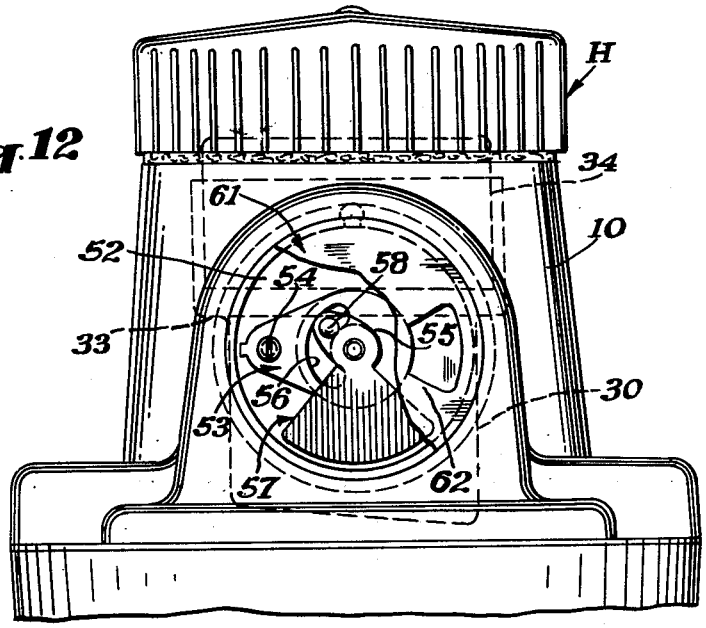
Fig. 12 is a side elevation of the signal mechanism with parts broken away; and, Fig. 13 is a similar view with the signal flag actuated so as to be visible.
Figure 13:
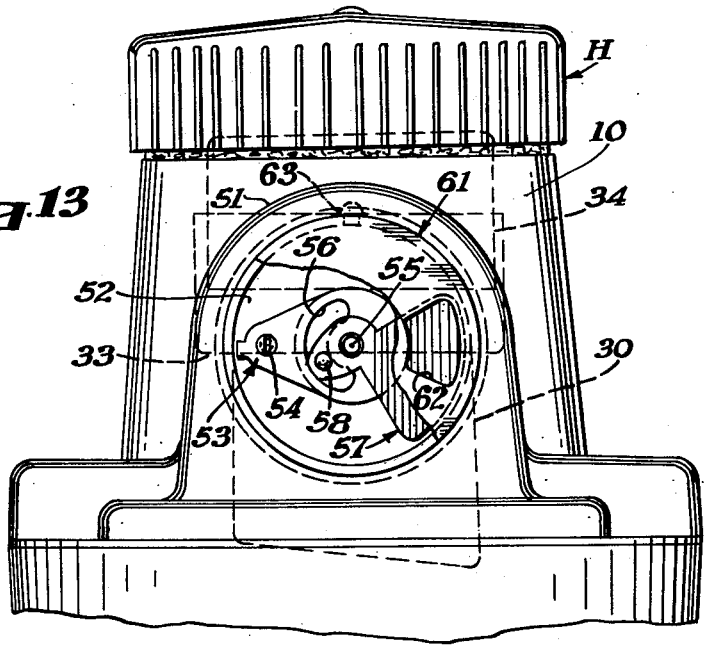

The valve V includes upper and lower body sections 10 and 11, the lower section being formed to provide a pressure chamber 13 bounded in part by a regulating diaphragm 14, the body parts being retained together by means of suitable screws 15. An outlet or service port 16 leads from the pressure chamber, and a pair of inlet ports lead thereto for connection to the cylinders or containers for the fuel.

A regulating valve assembly is provided for each of the inlet ports. For example, port 18 is controlled by a valve assembly retained in a threaded bore 19 that receives the threaded plug member 21. Plug member 21 is apertured as at 22 to permit the flow of gas therethrough, and has formed at its lower end a valve seat 23. The movable valve member 24 is mounted in a suitable bore in the lower valve body section and is urged against seat 23 by means of spring 26. A valve opening pin 27, which is of smaller diameter than bore 22, is guided by means of a plate 28 mounted on a pair of posts 29 and fastened by suitable screws. The construction of the valve for the other inlet port 17 is identical to that just described, and corresponding parts have been designated by the same numerals with the addition of the subscript $a$.

In order to provide the regulating and changeover action, a simple, compact, and readily assembled structure is provided in the upper body section 10. A cup-shaped member 30 having an inclined bottom wall member 31 fastened thereto is slidably and rotatably mounted in the bore 31a of the upper body section. As seen in Figs. 3 and 4, member 30 has a plurality of indented or spline-like portions 32 terminating in a circumferential shoulder 33 that extends around its periphery which, as will be explained presently, is for the operation of a signal flag. An upper spring retaining member 34, also cup-shaped in the preferred construction, has spline-like grooves 35 which key the two cup-shaped members together against relative rotation, but permit relative sliding motion thereof. Member 34 has riveted thereto a post 36 which is tapped for fastening means that retain the manually operable handle H.

A regulating spring 37 is disposed within the telescoping enclosure formed by members 30 and 34. In order to restrain the upper member 34 against axial force of the regulating spring 37, a combined indexing and retaining plate 38 is fastened in the valve body by means of a snap ring 39. As seen in Fig. 7, plate 38 includes a tongue 41 that fits within a suitable notch 42 in the valve body to hold the plate against rotation. A pair of fingers 43 and 44 are struck from the plate 38 to act as indexing or stop means to limit rotation of the spring cartridge.

In order to effect rotation of the spring cartridge upon rotation of the handle H, a toothed spring plate 46 has a stop finger 47 struck therefrom and a non-circular aperture 48 for driving engagement with the non-circular post 36 attached to the upper cup-shaped member 34. Toothed plate 46 is inserted in the handle and flattened, which securely mounts it in the handle and permits it to rotate the spring cartridge. The tongue 47 moves with the handle and selectively engages tongues 43 and 44 on the retaining plate 38 so that the handle may partake of substantially 180° of rotation. Similar construction is disclosed and claimed in the application of Theodore A. St. Clair, Serial No. 109,595, filed August 10, 1949, and assigned to The Weatherhead Company.

Novel, compact, and effective signal means are provided to indicate an automatic changeover between service and reserve tanks. An enlargement 51 of the upper body section 10 is counterbored for mounting the signal device. The inner wall 52 of the enlargement 51 is centrally apertured and disposed over the aperture is an adjusting plate 53 adjustably secured in the body by screw means 54. A pin 55 extends outwardly from adjusting plate 53 and an arcuate notch 56 is likewise formed in the adjusting plate. The signal flag 57, which may be painted red, is pivotally mounted on the adjusting plate by means of pin 55 and extending rearwardly from the flag is an operating pin 58 disposed beneath the circumferential shoulder 33 on lower cup-shaped member 30.

Felt washer 49 acts as a filter for dirt and water as the valve breathes due to diaphragm motion. The washer is oiled so that water vapor cannot wet it, which prevents freezing and sticking of the handle in cold weather.

In order to conceal the flag from view except when the signal is to be displayed, a disc 61 is disposed within the enlargement 51 and conceals the flag until it is brought behind a window 62 formed in the disc. In order to prevent rotation of the windowed disc tongue 63 extends from the disc into a small bore in the valve body. To protect the parts a transparent plastic disc 64 is retained in the body by means of a flexible ring 65 which may be formed of rubber or of any resilient material. Suitable indicia are provided on the handle to inform the user whether it is set for service or reserve supply.

In operation, with the valve connected to tanks under full pressure and with the handle set to "Service," the operating member 27 or 27a depending upon which is associated with the service tank would be engaged by the diaphragm and the valve would act as a conventional pressure regulator valve. Due to lost motion in the signal mechanism and the arrangement of the window with respect to the flag, there is a range of pressures during which the flag is not visible, but as pressure in the service tank decreases the lower cup-shaped member 30 moves gradually downwardly and the upper edge of slot 33 engages pin 58 on the signal flag lifting the flag behind the window 62. The pressure at which the flag first appears or at which it is fully disclosed behind the window can be readily adjusted by loosening screw 54 and moving the adjusting plate 53 which positions the pin 58 relative to the slot 33. The adjustment is such that when the service tank is depleted to a minimum value, indication of this is given by the full disposition of the signal flag behind the window.

However, at this time the valve will automatically change over to the reserve tank because the diaphragm 14 will engage the valve operating pin for that tank. This admits fluid from the reserve tank although it will be regulated at a somewhat reduced pressure. Since this condition is indicated by the position of the signal flag the user is warned and may manipulate the handle and change over to the reserve tank. When he does so, the inclined bottom wall of cup 30 is turned through 180° as dictated by the indexing mechanism whereupon regulation of the reserve tank at its full initial pressure is provided so that the cup 30 is moved outwardly by fluid pressure to or toward its original position. This causes the diaphragm to clear the operating pin associated with the service tank so that the valve for this tank is fully closed, and the tank may be removed without loss of gas. Restoration of full pressure from the reserve tank with the attendant telescoping of the lower cup-shaped member likewise lifts the edge of the slot 33 that was in engagement with pin 58 of the signal flag so that the flag drops, by its own weight, clear of the window, indicating that suitable pressure is available from the reserve tank and that the depleted service tank has been isolated and may be disconnected from the system.

Having completed a detailed description of a preferred embodiment of the invention it can be seen that we have provided a simple, compact, economical valve assembly having effective and readily adjustable signaling mechanism and included in a simple, combined spring cartridge diaphragm changeover cam and signal-operating device.

Having completed a detailed description of a preferred form of the invention, it will be apparent that various modifications thereof may be made without departing from the essence of the invention as defined in the appended claims.

What is claimed is:

1. An automatic pressure regulator comprising a body having a pressure chamber, a regulating diaphragm in said body and defining one wall of said chamber, an inlet port in said body leading to said pressure chamber, a spring-closed valve for said inlet port, an outlet port leading from said pressure chamber, a diaphragm regulating spring in said body external of said pressure chamber, valve operating means to open said valve when the diaphragm is moved by said regulating spring, a plate adjustably mounted on said body, a signal flag, pivot means for mounting said flag on said plate, diaphragm engaging means movable with said diaphragm, interengaging abutment means on said flag and diaphragm engaging means for operating said signal flag, said pivot and abutment means being eccentric whereby motion of said plate in said body moves said pivot means relative to said abutment means and changes the position of the flag.

2. An automatic pressure regulator comprising a body having a pressure chamber, a regulating diaphragm in said body and defining one wall of said chamber, a pair of inlet ports in said body leading to said pressure chamber, spring-closed valves for said inlet ports, an outlet port leading from said pressure chamber, a cup-shaped member having a lower portion with an inclined bottom wall engaging said diaphragm external of said pressure chamber and an upper portion of greater diameter than said bottom portion forming a shoulder, a spring retaining member having a splined engagement with said cup-shaped member, a diaphragm regulating spring engaging said cup-shaped and spring retaining members, valve operating means in said pressure chamber and engaging said diaphragm to open said valves when the diaphragm is moved by said regulating spring, a signal flag pivotally mounted in said body and visible externally thereof, an eccentric pin on said flag and in engagement with the shoulder on said cup-shaped member for operating said signal flag.

3. An automatic pressure regulator comprising a body having a pressure chamber, a regulating diaphragm in said body and defining one wall of said chamber, diaphragm engaging means external of said chamber, an inlet port in said body leading to said pressure chamber, a spring-closed valve for said inlet port, an outlet port leading from said pressure chamber, said body including a housing external of said pressure chamber, a diaphragm regulating spring in said housing and engaging said diaphragm engaging means, valve operating means in said chamber to open said valve when the diaphragm is moved by said regulating spring, an aperture in the side wall of said housing, a plate adjustably mounted on said housing and extending at least partially across said aperture, a signal flag parallel to said plate, pivot means for mounting said flag on said plate, said pivot means being perpendicular to said plate, a disc mounted in said aperture and overlying said plate and flag, a window in said disc, interengaging abutment means on said diaphragm engaging means and signal flag for moving said flag under said window as said diaphragm moves in response to the force of said spring.

4. An automatic pressure regulator comprising a body having a pressure chamber, a regulating diaphragm in said body and defining one wall of said chamber, diaphragm engaging means external of said chamber, an inlet port in said body leading to said pressure chamber, a spring-closed valve for said inlet port, an outlet port leading from said pressure chamber, said body including a housing external of said pressure chamber, a diaphragm regulating spring in said housing and engaging said diaphragm engaging means, valve operating means in said chamber to open said valve when the diaphram is moved by said regulating spring, an aperture in the side wall of said housing, a plate adjustably mounted on said housing and extending at least partially across said aperture, a signal flag parallel to said plate, pivot means for mounting said flag on said plate, said pivot means being perpendicular to said plate, a disc mounted in said aperture and overlying said plate and flag, a window in said disc, interengaging abutment means on said diaphragm engaging means and signal flag for moving said flag under said window as said diaphragm moves in response to the force of said spring, said pivot and abutment means being eccentric whereby motion of said plate in said body moves said pivot means relative to said abutment means and changes the position of the flag.

5. An automatic pressure regulator comprising a body having a pressure chamber, regulating diaphragm means in said body and defining one wall of said chamber, diaphragm backing means external of said chamber, a pair of inlet ports in said body leading to said pressure chamber, spring-closed valves for said inlet ports, an outlet port leading from said pressure chamber, said body including a housing external of said pressure chamber, a first sheet metal cup-shaped member in said housing and having an inclined bottom wall portion engaging said diaphragm means, a second sheet metal cup-shaped member in said housing and having a splined engagement with said first cup-shaped member, said cup-shaped members cooperating to form a spring chamber, said cup-shaped members having complementary indentations to key them together, a diaphragm regulating spring within the chamber formed by said cup-shaped members, means to retain said second member in said body against the force of said spring, manual means keyed to said second member for rotating said second member, valve operating means in said pressure chamber and engaging said diaphragm to open said valves when the diaphragm is moved by said regulating spring, an aperture in the side of said housing, a plate adjustably mounted on said housing and extending at least partially across said aperture, a signal flag parallel to said plate, pivot means for mounting said flag on said plate, said pivot means being perpendicular to said plate, a disc mounted in said aperture and overlying said plate and flag, a window in said disc, and interengaging abutment means on said first cup-shaped member and flag for moving said flag under said window as said diaphragm moves in response to the force of said spring.

6. An automatic pressure regulator comprising a body having a pressure chamber, regulating diaphragm means in said body and defining one wall of said chamber, diaphragm backing means external of said chamber, a pair of inlet ports in said body leading to said pressure chamber, spring-closed valves for said inlet ports, an outlet port leading from said pressure chamber, said body including a housing external of said pressure chamber, a first sheet metal cup-shaped member in said housing and having an inclined bottom wall portion engaging said diaphragm means, a second sheet metal cup-shaped member in said housing and having a splined engagement with said first cup-shaped member, said cup-shaped members cooperating to form a spring chamber, said cup-shaped members having complementary indentations to key them together, a diaphragm regulating spring within the chamber formed by said cup-shaped members, means to retain said second member in said body against the force of said spring, manual means keyed to said second member for rotating said second member, valve operating means in said pressure chamber and engaging said diaphragm to open said valves when the diaphragm is moved by said regulating spring, an aperture in the side of said housing, a plate adjustably mounted on said housing and extending at least partially across said aperture, a signal flag parallel to said plate, pivot means for mounting said flag on said plate, said pivot means being perpendicular to said plate, a disc mounted in said aperture and overlying said plate and flag, a window in said disc, and interengaging abutment means on said first cup-shaped member and flag for moving said flag under said window as said diaphragm moves in response to the force of said spring, said pivot and abutment means being eccentric whereby motion of said plate in said body moves said pivot means relative to said abutment means and changes the position of the flag.

ALTON L. AREY.
THEODORE A. ST. CLAIR.

REFERENCES CITED

The following references are of record in the file of this patent:

UNITED STATES PATENTS

| Number | Name | Date |
| --- | --- | --- |
| 478,949 | Beery | July 12, 1892 |
| 2,197,144 | Carnes | Apr. 16, 1940 |
| 2,380,956 | Evarts | Aug. 7, 1945 |
| 2,488,779 | Olson | Nov. 22, 1949 |